(12) United States Patent
West et al.

(10) Patent No.: US 10,486,314 B1
(45) Date of Patent: Nov. 26, 2019

(54) SENSOR ASSEMBLY AND ROBOTIC SYSTEM INCLUDING AN ORTHOPLANAR SPRING HAVING MULTIPLE LEGS

(71) Applicants: Jerry Michael West, Tampa, FL (US); Redwan Alqasemi, Wesley Chapel, FL (US); Rajiv Dubey, Tampa, FL (US)

(72) Inventors: Jerry Michael West, Tampa, FL (US); Redwan Alqasemi, Wesley Chapel, FL (US); Rajiv Dubey, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 15/799,899

(22) Filed: Oct. 31, 2017

Related U.S. Application Data

(60) Provisional application No. 62/415,784, filed on Nov. 1, 2016.

(51) Int. Cl.
*B25J 17/02* (2006.01)
*B25J 13/08* (2006.01)
*G01L 5/00* (2006.01)
*G01L 25/00* (2006.01)
*G01L 5/16* (2006.01)

(52) U.S. Cl.
CPC ......... *B25J 13/085* (2013.01); *B25J 17/0208* (2013.01); *G01L 5/0042* (2013.01); *G01L 5/16* (2013.01)

(58) Field of Classification Search
CPC ........ B25J 15/04; B25J 15/0491; F16F 1/027; F16F 3/023; F16F 15/073; F16F 2236/027; F16F 1/324; F16F 3/026; F16M 13/00; F16M 11/12; F16M 2200/04; F16M 11/043; F16H 21/12; F16H 21/04; F16H 21/44; Y10S 251/902; Y10T 403/58; Y10T 29/4989; Y10T 29/49815; Y10T 74/18408; Y10T 74/18992
See application file for complete search history.

(56) References Cited

U.S. PATENT DOCUMENTS 6,983,924 B2 * 1/2006 Howell ............... F16F 1/027
251/118
8,601,897 B2 * 12/2013 Lauzier ............... B25J 17/0208
74/490.01
9,134,817 B2 * 9/2015 Olsson ............... G06F 3/0338
(Continued)

OTHER PUBLICATIONS

Zeng, et al., "An overview of robot force control", Robotica, Bol. 15, 1997.
(Continued)

*Primary Examiner* — Brandi N Hopkins
(74) *Attorney, Agent, or Firm* — Thomas | Horstemeyer, LLP

(57) ABSTRACT

In one embodiment, a compliant force/torque sensor includes an orthoplanar spring including a central platform and multiple legs that extend out from the platform, a support member configured to support the orthoplanar spring, wherein the legs of the orthoplanar spring are mounted to the support member in a manner in which the central platform of the orthoplanar spring can move relative to the support member, and sensor elements configured to sense movement of the central platform of the orthoplanar spring relative to the support member.

9 Claims, 7 Drawing Sheets

(56) References Cited

U.S. PATENT DOCUMENTS

| | | | | |
|---|---|---|---|---|
| 2009/0259412 | A1* | 10/2009 | Brogardh | B25J 9/1633 702/41 |
| 2013/0265233 | A1* | 10/2013 | Obermeyer | G05G 9/047 345/161 |
| 2014/0123786 | A1* | 5/2014 | Hendershott | F16H 21/04 74/69 |
| 2015/0323398 | A1* | 11/2015 | Lauzier | B25J 9/0081 73/862.08 |

OTHER PUBLICATIONS

Ataollahi, Asghar, Arash Soleiman Fallah, Lakmal D. Seneviratne, Prokar Dasgupta, and Kaspar Althoefer. "Novel Force Sensing Approach Employing Prismatic-Tip Optical Fiber Inside an Orthoplanar Spring Structure." IEEE/ASME Transactions on Mechatronics 19.1 (2014): 121-30.

Yoshikawa, Tsuneo, "Force control of robot manipulators", Proceedings of the 2000 IEEE, Apr. 2000.

Mason, Matthew, "Compliance and Force Control for Computer Controlled Manipulators", IEEE Transactions on Systems, Man, and Cybernetics 11.6, 1981.

Shirey, et al., "Hybrid active/passive interaction control for robot manipulators", Proceedings, Thirty-Six Southeastern Symposium on System Theory, 2004.

Whitney, Daniel E. "Force Feedback Control of Manipulator Fine Motions." Journal of Dynamic Systems, Measurement, and Control 99.2: pp. 91-97. 1977.

Roberts, R., Paul, R. and Hillberry, B. "The Effect of Wrist Force Sensor Stiffness on the Control of Robot Manipulators." Proceedings IEEE International Conference on Robotics and Automation: pp. 269-274. 1985.

Mandal, N., Payandeh, S. "Experimental Evaluation of the Importance of Compliance for Robotic Impact Control." Proceedings. IEEE International Conference on Control and Applications: pp. 511-516. 1993.

Eppinger, et al., "On dynamic models of robot force control", Artificial Intelligence Laboratory, IEEE 1986.

Schutter, J. D., Van, H. "Compliant Robot Motion II. A Control Approach Based on External Control Loops." The International Journal of Robotics Research 7.4: pp. 18-33. 1988.

Lindsay, T., Sinha, P., and Paul, R. "An Instrumented Compliant Wrist for Robotics Applications." Proceedings. IEEE International Conference on Robotics and Automation: pp. 648-653. 1993.

Xu, et al., "A robot compliant wrist system for automated assembly", Proceedings IEEE International Conference on Robotics and Automation, 1990.

Hashimoto, M., Imamura, Y. "Design and Characteristics of a Parallel Link Compliant Wrist." Proceedings. IEEE International Conference on Robotics and Automation: pp. 2457-2462. 1994.

Schoisengeier, A., Lindenroth, L., Back, J., Qiu, C., Noh, Y., Althoefer, K., Dai, J., Rhode, K., and Liu, H. "Design of a Flexible Force-sensing Platform for Medical Ultrasound Probes." Proceedings. 6th IEEE International Conference on Biomedical Robotics and Biomechatronics: pp. 278-283. 2016.

Camacho, et al., "Alternative method to calculate the magnetic field of permanent magnets with azimuthal symmetry", Mexican Journal of Physics, 2013.

Parise, et al., "Ortho-planar linear-motion springs", Mechanism and Machine Theory 36, 2001.

Qiu, C., Qi, P., Liu, H., Althoefer, K. and Dai, J. S. "Six-Dimensional Compliance Analysis and Validation of Orthoplanar Springs." Journal of Mechanical Design 138.4. 2016.

Su, et al., "A symbolic formulation for analytical compliance analysis and synthesis of flexure mechanism", Journal of Mechanical Design, 20102.

Kesner, S. B., Howe, R. D. "Design Principles for Rapid Prototyping Forces Sensors Using 3-D Printing." IEEE/ASME Transactions on Mechatronics 16.5: pp. 866-870. 2011.

Kyberd, P. J., Chappell, H. "A Force Sensor for Automatic Manipulation Based on the Hall-effect." Measurement Science and Technology 4.3: pp. 281-287. 1993.

West, J. M. "Orthoplanar Spring Based Compliant Force/ Torque Sensor for Robot Force Control." MS Thesis. University of South Florida, 2017.

Muntwyler, S., Beyeler, F., and Nelson, B. "Three-axis Micro-force Sensor with Sub-micro-Newton Measurement Uncertainty and Tunable Force Range." Journal of Micromechanics and Microengineering 20.2. 2009.

Salisbury, Kenneth, "Active stiffness control of a manipulator in cartesian coordinates", 19th IEEE Conference on Decision and Control Including the Symposium on Adaptive Processes, 1980.

Field., et al., "Model reference impedance control of robotic manipulators", Proceedings, IEEE Pacific Rim Conference on Communications Computers and Signal Processing, 1993.

Raibert, et al., "Hybrid position/force control of manipulators", Journal of Dynamic Systems, Measurement, and Control, 1981.

Maples, et al., "Experiements in force control of robotic manipulators", Proceedings, IEEE international conference on robotics and automation, 1986.

Vukobratovic, et al., "Contract Control Concepts in Manipulation Robotics—An Overview", IEEE transactions industrial electronics, 1994.

Chiou, et al., Effect of joint stiffness on the dynamic stability of a one-link force-controlled manipulator, Robotica, 1986.

Payandeh, Shahram, "On the effect of compliance in robotic contact tasks problem", Proceedings of the American Control Conference, Jun. 1995.

Bekhti, et al., "Miniature capacitive three-axis force sensor", IEEE/RSJ international conference on Intelligent robots and systems, Sep. 2014.

Lange, et al., "Revised force control using a compliant sensor with a position controlled robot", Proceedings, IEEE International conference on robotics and automation, 2012.

Marrone, et al., "Cleaning assistant—a service robot designed for cleaning tasks", Proceedings, IEEE/ASME International conference on Advanced Intelligent Mechatronics, 2001.

Lorenz, et al., "New sensors for new applications: force sensors for human/robot interaction", Proceedings of the 1999 IEEE International Conference on Robotics and Automation.

Dai, et al., "Compliance analysis of a three-legged rigidly-connected platform device", Journal of Mechanical Design, 2006.

McCall, et al., "A linear position transducer using a magnet and hall effect devices", IEEE transactions on instrumentation and measurement, Jun. 1977.

Kumar, et al., Design and modeling of a polymer force sensor, IEEE/ASME transactions on mechatronics, 2016.

Orin, et al., "Efficient computation of the Jacobian for robot manipulators", The International Journal of Robotics Research, 1984.

* cited by examiner

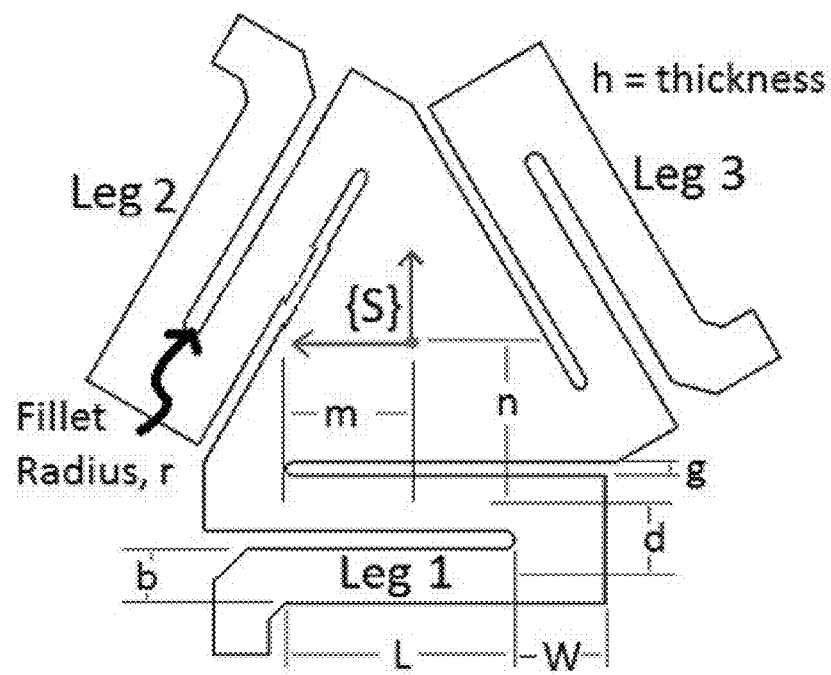
FIG. 4
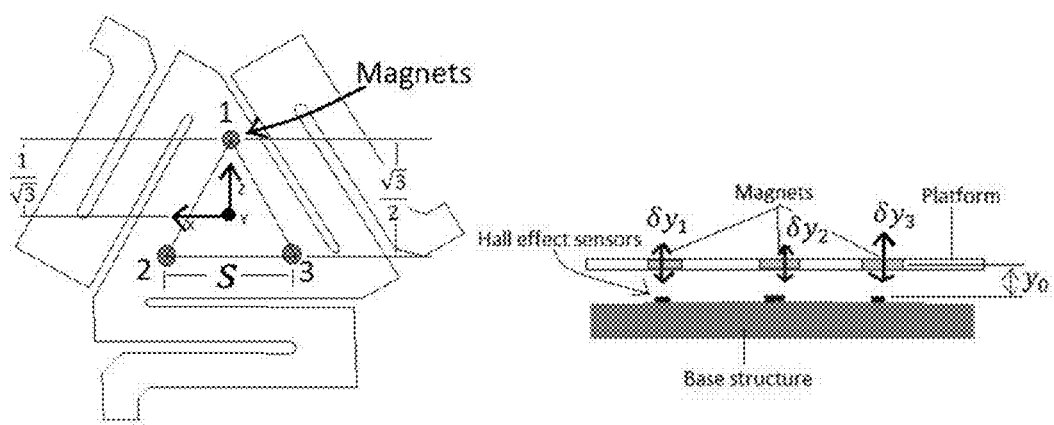
FIG. 6A  FIG. 6B

SENSOR ASSEMBLY AND ROBOTIC SYSTEM INCLUDING AN ORTHOPLANAR SPRING HAVING MULTIPLE LEGS

CROSS-REFERENCE TO RELATED APPLICATION

This application claims priority to U.S. Provisional Application Ser. No. 62/415,784, filed Nov. 1, 2016, which is hereby incorporated by reference herein in its entirety.

BACKGROUND

There are many robotics applications in which a robot must perform tasks that require contact with its environment. During performance of these tasks, compliant motion of the manipulator is required to prevent position errors from causing large contact forces as they can cause damage or lead to task failure. Compliant motion can be achieved by passive or active means. Active compliance uses force control to ensure the manipulator behaves compliantly when in contact with the environment, while passive compliance uses elastic elements or structural compliance of the manipulator. Although active compliance has well-known stability and performance issues, it is more versatile than passive compliance. Furthermore, the use of excessive passive compliance is detrimental to positioning accuracy and bandwidth of the robot. To overcome stability issues and improve performance of force control, passive and active compliance can be used together. Accordingly, it would be desirable to have apparatus that enables the simultaneous use of active and passive compliance in robotics applications.

BRIEF DESCRIPTION OF THE DRAWINGS

The present disclosure may be better understood with reference to the following figures. Matching reference numerals designate corresponding parts throughout the figures, which are not necessarily drawn to scale.

FIG. 4 is a top view of an embodiment of an orthoplanar spring showing design parameters of the spring.

FIGS. 6A and 6B are top and side views, respectively, that illustrate an embodiment of a layout for magnets and Hall-effect sensors for a compliant force/torque sensor.

DETAILED DESCRIPTION

As described above, it would be desirable to have apparatus that enables the simultaneous use of active and passive compliance in robotics applications. Disclosed herein are compliant force/torque sensors that are useful in such a capacity. In some embodiments, the sensors comprise an orthoplanar spring that is attached to a support member. The sensors further comprise sensor elements that enable measurement of deformation of the orthoplanar spring relative to the support member, which can be used to calculate the force and/or torque that is being applied to a component associated with the sensor, such as a robotic end effector. In some embodiments, the sensor elements comprise one or more magnets mounted to the orthoplanar spring and one or more Hall-effect sensors mounted to the support member in proximity to the one or more magnets. In such cases, displacement of the magnets (and therefore deformation of the orthoplanar spring) can be sensed by the Hall-effect sensors and output as voltages that can be converted into forces and/or torques. The force and/or torque information can then be used to control operation of the end effector and/or a manipulator to which the end effector is mounted.

In the following disclosure, various specific embodiments are described. It is to be understood that those embodiments are example implementations of the disclosed inventions and that alternative embodiments are possible. All such embodiments are intended to fall within the scope of this disclosure.

It has been well established both theoretically and experimentally that passive compliance near the contact point has a beneficial effect on the stability of force control. A system that is more stable can also be made more responsive because control gains may be increased without causing instability. Dynamic models of damping force control have shown that the allowable force control gains are proportional to the contact compliance. Studies have also shown that important drivers of instability are the joint and structural flexibilities of the robot.

Figure 1:
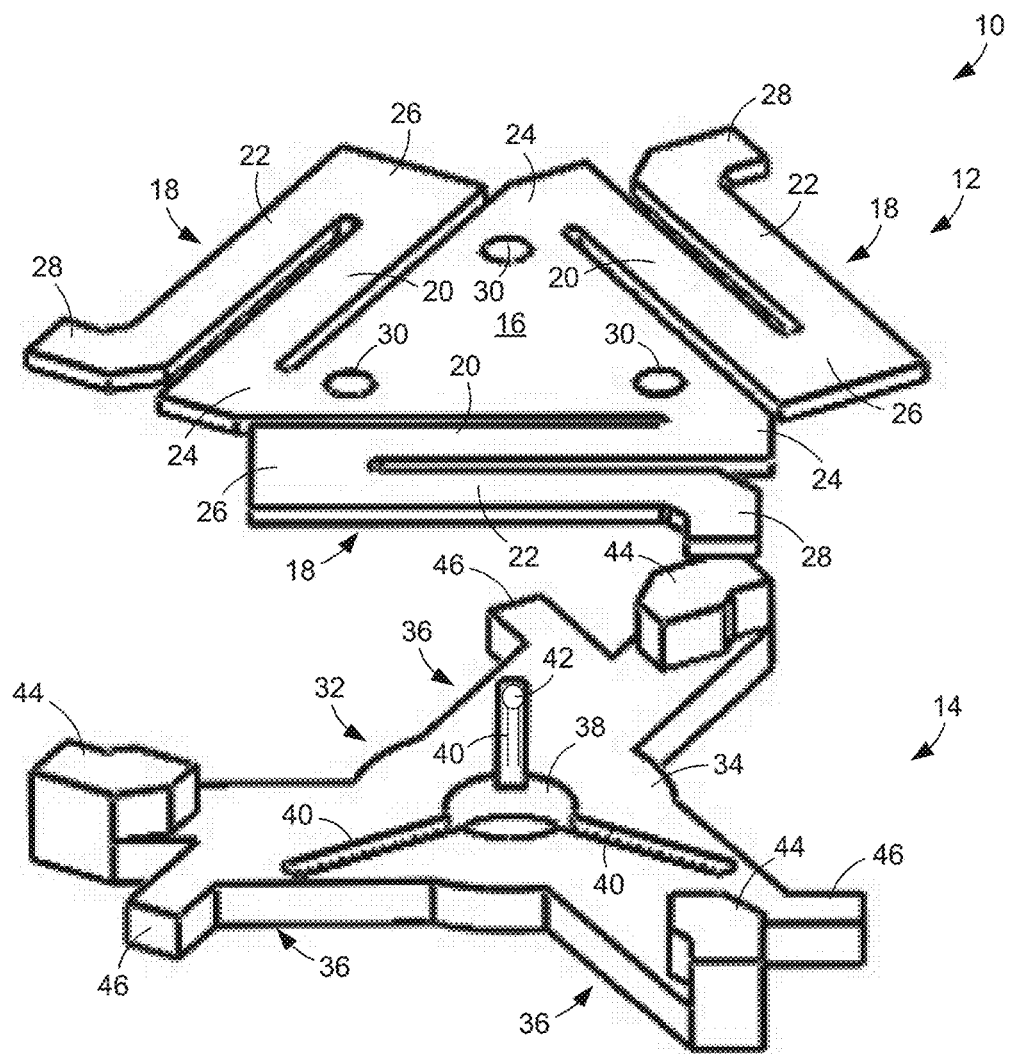
FIG. 1 is an exploded perspective view of an embodiment of a compliant force/torque sensor.

FIG. 1 illustrates an embodiment of a compliant force/torque sensor 10 in exploded view. As shown in this figure, the sensor 10 generally comprises an orthogonal spring 12 and a support member 14 to which the spring mounts. The orthoplanar spring 12 is a thin, planar element that is unitarily formed from a single piece of flexible material, such as a polymeric material or a non-magnetic metal material. In some embodiments, the flexible material comprises a thermoplastic material, such as polyoxymethylene (POM). In other embodiments, the flexible material comprises a thermoset polymer material. In the latter case, the flexible material is less susceptible to creep, which can skew the deformation measurements that are obtained by the sensor 10.

With further reference to FIG. 1, the orthoplanar spring 12 generally comprises a central platform 16 from which extend three flexible legs 18. In the illustrated embodiment, the central platform 16 is generally triangular and each of the legs extends from a corner (vertex) of the triangle shape. Each leg 18 is a meandered element that includes first (inner) and second (outer) leg segments 20 and 22. Each of the leg segments 20, 22 is elongated and generally parallel to an outer edge of the central platform 16. The inner leg segments 20 connect to the central platform 16 with a unitary "hip" portion 24 and further connect to their associated outer leg segments 22 with a unitary "knee" portion 26. Outwardly extending from the distal end of each outer leg segment 22 is a mounting tab 28 that facilitates mounting of the orthoplanar spring 12 to the support member 14. As is also shown in FIG. 1, the orthoplanar spring 12 further includes magnets 30. In the illustrated embodiment, one magnet 30 is mounted to the central platform 16 near each corner of the platform and, therefore, near each hip portion 24, such that the orthoplanar spring 12 comprises a total of three magnets. Use of three magnets facilitates determination of force and/or torque along three different axes.

The support member 14 is configured to receive and support the orthoplanar spring 12. To that end, the support member 14 has a shape that is similar to that of the orthoplanar spring 12. In some embodiments, the support member 14 is also unitarily formed from a single piece of material, such as a polymeric material or a non-magnetic metal material. Unlike the orthoplanar spring 12, however, the support member 14 is generally rigid (i.e., generally inflexible). As shown in FIG. 1, the support member 14 includes a generally planar base 32 that includes a generally circular central portion 34 from which extend three legs 36. The central portion 34 includes a central opening 38 that facilitates mounting of the sensor 10 to other apparatus and elongated grooves 40 that extend radially outward form the opening and along a portion of the legs 36. Provided in each groove 40 is a Hall-effect sensor 42 that is each positioned in proximity to one of the magnets 30 when the orthoplanar spring 12 is mounted to the support member 14.

With continued reference to FIG. 1, provided at a distal end of each leg 36 is a raised mounting platform 44 that is each configured to receive a mounting tab 28 of the orthoplanar spring 12. Also provided at the distal end of each leg 36 is a mechanical stop mounting tab 46 that is each configured to receive a mechanical stop (see FIGS. 7 and 8) that limits the degree to which the orthoplanar spring 12 can deform to prevent damage of the spring.

Figure 2:
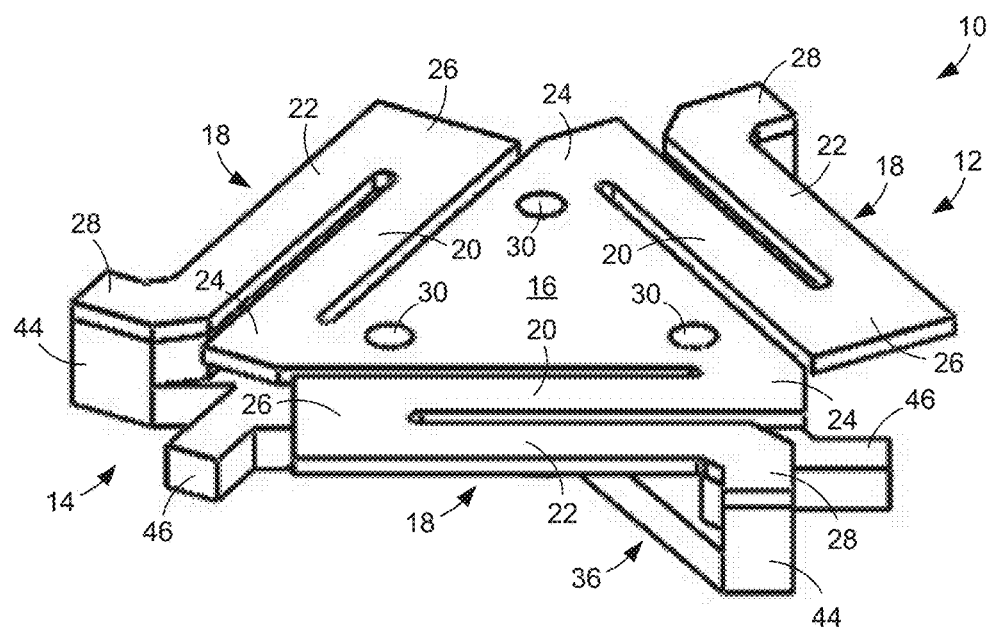
FIG. 2 is a perspective view of the compliant force/torque sensor of FIG. 1 shown in an assembled configuration.

FIG. 2 shows the orthoplanar spring 12 mounted to the support member 14 to form the compliant force-torque sensor 10. As is shown in this figure, each mounting tab 28 of the orthoplanar spring 12 is positioned on top of a mounting platform 44 of the support member 14. When the sensor 10 is assembled, the mounting tabs 28 are securely affixed to the mounting platforms 44. Such affixation can be achieved using one or more of adhesive, welding, or mechanical fasteners. As is apparent from FIG. 2, when the sensor 10 is assembled, the central platform 16 is positioned above the central portion 34 of the support member 14 in a spaced configuration to enable the central platform to move up and down (in the context of FIG. 2) relative to the support member. As is also apparent from FIG. 2, each magnet 30 is positioned immediately above a Hall-effect sensor 42 so that even slight displacements of the magnets can be detected.

Compliance analysis can be used to determine the compliance of a central platform of an orthoplanar spring, such as the spring 12. The compliance matrix assumes the knee portion 26 is rigid, however, finite element analysis of a preliminary design revealed that the portion possessed significant compliance. To account for compliance of the knee portion 26, previously derived results were modified by increasing the effective length of the orthoplanar spring's leg segments (beams) 20, 22 in the compliance analysis.

To find the increase in effective beam length required, finite element simulations were performed on an isolated beam-knee geometry. The boundary conditions applied were similar to that experienced by the beam-knee geometry as part of the orthoplanar spring. The results of the finite element analysis indicated that the increase in effective beam length can be expressed as:

$$\frac{\delta L_{eff}}{c} = f\left(\frac{b}{c}, \frac{b}{h}\right) \quad (1)$$

where $\delta L_{eff}$ is the change in effective beam length due to the connector, c is half the knee length, b is the beam width, and h is the orthoplanar spring thickness. In conjunction with elementary beam theory, data collected from finite element analysis simulations was used to determine the function $$f\left(\frac{b}{c}, \frac{b}{h}\right).$$

According to elementary beam theory, the deflection of a cantilevered beam with a transverse force, F, applied at its end is given by:

$$\delta = \frac{FL^3}{3EI} \quad (2)$$

where F is the transverse force, L is the beam length, E is the elastic modulus, and I is the beam's second moment of area. The deflections found in the finite element simulations ($\delta_{FEA}$) were used to compute an effective beam length found by solving Equation 2 for length. This calculated length is then given by:

$$L_{eff} = \left(\frac{3EI\delta_{FEA}}{F}\right)^{\frac{1}{3}} \quad (3)$$

The change in effective length is then given by:

$$\delta L_{eff} = L_{eff} - L \quad (4)$$

This change in beam length was found for b/c and b/h values covering the considered design space. A least squares linear regression yielded:

$$\frac{\delta L_{eff}}{c} = 0.3694\left(\frac{b}{c}\right) - 0.0569\left(\frac{b}{h}\right) + 0.9239 \quad (5)$$

The root-mean-square error for this curve fit is $RMS_{error} = 0.1098$ with an R-squared value of 0.99. $L_{eff}$ is used in place of L in the expressions for compliance presented in previous studies.

The stress at critical points of the orthoplanar spring will now be discussed. A displacement load normal to the plane of the orthoplanar spring can be applied to the central platform and the maximum stresses at the ends of each beam segment can be calculated. Neglecting torsional stress, each beam segment is a fixed guided beam with a maximum bending stress given by:

$$\sigma = \frac{\delta y L_{eff}}{C_y b h^2} \quad (6)$$

where $\delta y$ is the displacement of the central platform normal to the plane of the orthoplanar spring, and $C_y$ is the corresponding compliance.

Figure 3:
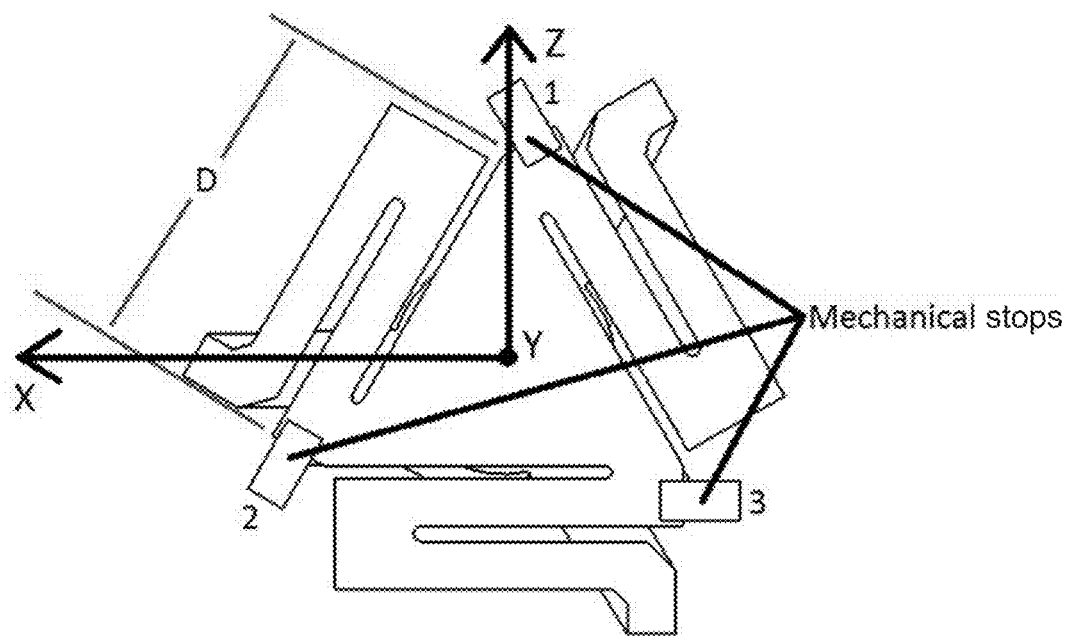
FIG. 3 is a top view of an embodiment of an orthoplanar spring showing a mechanical stop layout and a coordinate system.

The task of designing the mechanical stops is essentially the task of answering the question: How much deflection should be allowed at the points where the mechanical stops are installed? To answer this question, displacements of the central platform must be transformed into displacements at points on the orthoplanar spring where mechanical stops are installed. For the case in which the mechanical stops are located at the vertices of the central platform as shown in FIG. 3, this transformation is given by:

$$\begin{bmatrix} \delta y_1 \\ \delta y_2 \\ \delta y_3 \end{bmatrix} = J_m^{-1} \begin{bmatrix} \delta y \\ \delta \theta_x \\ \delta \theta_z \end{bmatrix} \quad (7)$$

where $\delta y_i$ is the displacement of the central platform at mechanical stop i, $\delta \theta_x$ and $\delta \theta_z$ are the rotational displacements about the X and Z axes shown in FIG. 3, and $J_m$ is the Jacobian relating platform displacement to deflections at the mechanical stops. The relationship between deflections at the mechanical stops and the forces and moments acting on the sensor is then given by:

$$\begin{bmatrix} \delta y_1 \\ \delta y_2 \\ \delta y_3 \end{bmatrix} = J_m^{-1} C \begin{bmatrix} F_y \\ M_x \\ M_z \end{bmatrix} \quad (8)$$

where $F_y$, $M_x$, and $M_z$ are the forces and moments acting on the sensor. If only central platform displacements in the compliant degrees of freedom are considered, C is given by:

$$C = \begin{bmatrix} C_y & 0 & 0 \\ 0 & C_{\theta x} & 0 \\ 0 & 0 & C_{\theta z} \end{bmatrix} \quad (9)$$

Referring to the coordinate system in FIG. 3, the measurement range specifications of the sensor may be written as:

$$F_{yMin} < F_y < F_{yMax} \quad (10)$$

$$M_{xMin} < M_x < M_{xMax} \quad (11)$$

$$M_{zMin} < M_z < M_{zMax} \quad (12)$$

The maximum and minimum deflections at the mechanical stop locations must be found under the range of loadings corresponding to the measurement range. For the case in which the mechanical stops are located at the vertices of the central platform, the forces and moments that result in the largest deflection at each mechanical stop may be found by inspection. For example, the forces and moments that result in the maximum deflections at mechanical stop 1, shown in FIG. 3, are given by:

$$F_{max,1} = [F_{yMax} \; M_{xMin} \; 0]^T \quad (13)$$

and $$F_{min,1} = [F_{yMin} \; M_{xMax} \; 0]^T \quad (14)$$

where $F_{max,1}$ and $F_{min,1}$ are the force-moment vectors causing the maximum positive and maximum negative displacements at the mechanical stops. The corresponding maximum and minimum deflections at each mechanical stop are then found using Equation 8. If each mechanical stop has the same design then, to ensure interference is avoided, each mechanical stop must allow a deflection range given by:

$$\text{Def.Range} = \max(\delta_{max,1}, \delta_{max,2}, \delta_{max,3}) - \min(\delta_{min,1}, \delta_{min,2}, \delta_{min,3}) \quad (15)$$

where $\delta_{max,k}$ and $\delta_{min,k}$ are the maximum positive and maximum negative displacements at the mechanical stops.

An iterative design procedure for the orthoplanar spring and mechanical stops begins with a trial material, beam geometry, and beam location. The design parameters are listed in Table 1.

TABLE 1

Orthoplanar spring parameters.

| Type of Parameters | Parameters |
| --- | --- |
| Material | E, Elastic modulus |
|  | G, Shear modulus |
|  | $S_y$, Yield strength |
|  | $S_f$, Fatigue strength |
| Beam geometry | b, L, h |
| Beam location | m, n, d, g (defined in FIG. 3) |
| Misc. | w (see FIG. 3) |

A definition of footprint is needed to check against design specifications for a given trial design. The diameter of a circle which circumscribes the orthoplanar spring was used as a measure of footprint. For a range of design parameters, this diameter is given by:

$$Dia. = 2\sqrt{(L+w+m)^2 + \left(n+d+\frac{1}{2}b\right)^2} \quad (16)$$

where the parameters w, m, n, and d are defined in FIG. 4.

Figure 5:
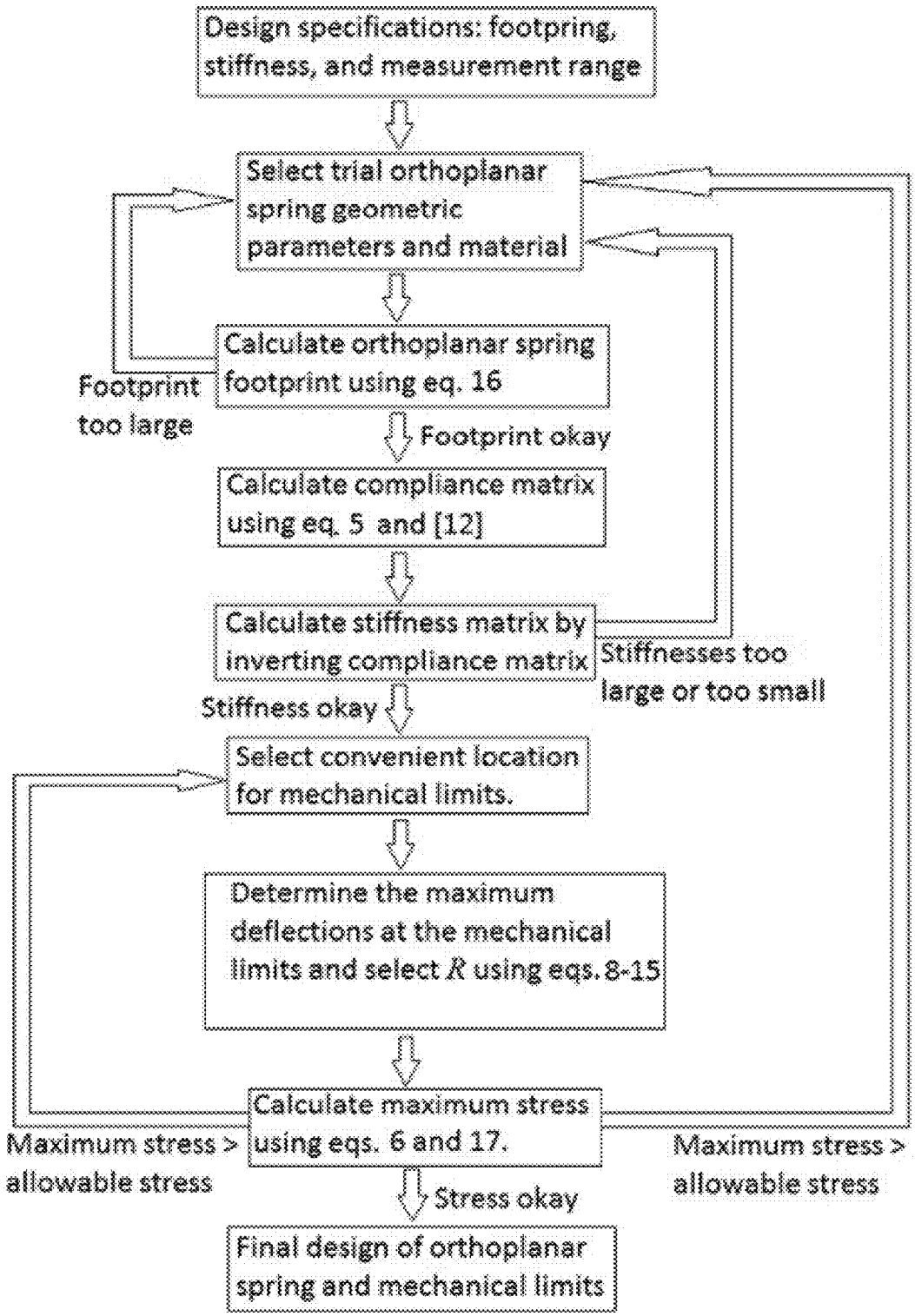
FIG. 5 is a flow diagram of an embodiment of a mechanical design method that can be used to design a compliant force/torque sensor.

A design procedure is shown in FIG. 5. In the final step of the process, the maximum stress is calculated for the worst-case deflection of the central platform, which is determined by the design of the mechanical stops. Thus, stress is calculated by Equation 6 where:

$$\delta y = \max(\delta_{max,1}, \delta_{max,2}, \delta_{max,3}, -\delta_{mm,1}, -\delta_{mm,2}, -\delta_{mm,3}) \quad (17)$$

The forces and moments acting on the sensor can be converted into electrical signals from the Hall-effect sensors that are associated with the corresponding magnets, which are mounted on the orthoplanar spring. A mathematical model of this conversion is presented below.

It is initially noted that the relationship between applied forces and moments and magnet deflections is found by an equation similar to Equation 8, except a Jacobian corresponding to the magnet positions is used instead of the mechanical stop positions. The transducer model also requires a relationship between magnet motion and magnetic field at the Hall-effect sensors. The magnets may be modeled as electric current loops. The magnetic field along a magnets symmetry axis therefore has a form given by:

$$B = \frac{a}{(y^2 + r^2)^{\frac{3}{2}}} \quad (18)$$

where α is:

$$a = \frac{B_r}{2} \frac{t}{\sqrt{r^2+t^2}} \left[\left(\frac{t}{2}\right)^2 + r^2\right]^{\frac{3}{2}} \quad (19)$$

and
- y=Position along magnet symmetry axis, measured from center of magnet
- r=Magnet radius
- t=Magnet thickness
- $B_r$=Magnetic remanence.

Because the magnet is approximated by a single current loop, Equation 18 is valid when the thickness of the magnet is small compared to its diameter.

To complete the model of the transducer, it is noted that a linear Hall-effect sensor's nominal response is defined by its static sensitivity, K, quiescent voltage, $v_0$, and saturation voltages, $v_{sat}$. We now have a complete mathematical model of the conversion of force and moment into voltage outputs.

The transducer design parameters are listed in Table 2 and the general layout of Hall-effect sensors and magnets on the sensor are shown in FIGS. 6A and 6B. A design method involves selecting a Hall-effect sensor and magnet combination, yielding design values for the magnet and Hall-effect sensor parameters in Table 2. Then, s and $y_0$ may be chosen to minimize the effect of voltage errors on force and moment measurement errors and to avoid Hall-effect sensor saturation as will be discussed next.

TABLE 2

Transducer design parameters

| | |
|---|---|
| Placement parameters | s, $y_0$ (defined in FIG. 6) |
| Magnet parameters | t, r, $B_r$ |
| Hall-effect sensor parameters | K, $v_0$, $v_{sat}$ |

To ensure saturation is avoided for any applied load within the measurement range, the maximum deflections of each magnet need to be calculated. Assuming the configuration of the magnets is similar to that of the mechanical stops, equations similar to Equations 8, 13, and 14 may be used for each magnet to calculate these maximum deflections, where $J_m$ is replaced by $J_s$—the Jacobian relating central platform displacement to the displacements of the magnets. The undeflected Hall-effect sensor-magnet separation may be kept the same for each magnet and selected by:

$$y_0 = -\max(\delta_{min,1}, \delta_{min,2}, \delta_{min,3}) + y_{sat} \quad (20)$$

where $\delta_{min,i}$ is now the maximum negative displacement of magnet i and $y_{sat}$ is the saturation Hall-effect sensor-magnet separation. The maximum Hall-effect sensor-magnet separation is then given by:

$$y_{i,max} = y_0 + \delta_{i,max} \quad i=1,2,3 \quad (21)$$

for Hall-effect sensor-magnet pair i, where $\delta_{i,max}$ is the maximum positive displacement of magnet i.

Voltage errors have the greatest effect on force errors at maximum Hall-effect sensor-magnet separation. This effect may be quantified by the reciprocal of the derivative of the magnetic field with respect to Hall-effect sensor-magnet separation, given by:

$$\frac{dy_i}{dB} = -\frac{(y_{i,max}^2 + r^2)^{\frac{5}{2}}}{3ay_{i,max}} \quad (22)$$

This derivative may be used to propagate voltage errors into force or moment errors, $\delta F_k$, as:

$$\delta F_k = \frac{\delta V}{K} \sqrt{\sum_{j=1}^{3}\left\{[C^{-1}J_s]_{kj}^2 \left(\frac{dy_i}{dB}\right)^2\right\}}$$

where $\delta F_k$ is the $k_{th}$ element of the force-moment vector $[(\delta F_y, \delta M_x, \delta M_z)]$ and $\delta V$ is the voltage error. This force or moment error can be used as the basis of an optimization criteria.

Figure 7:
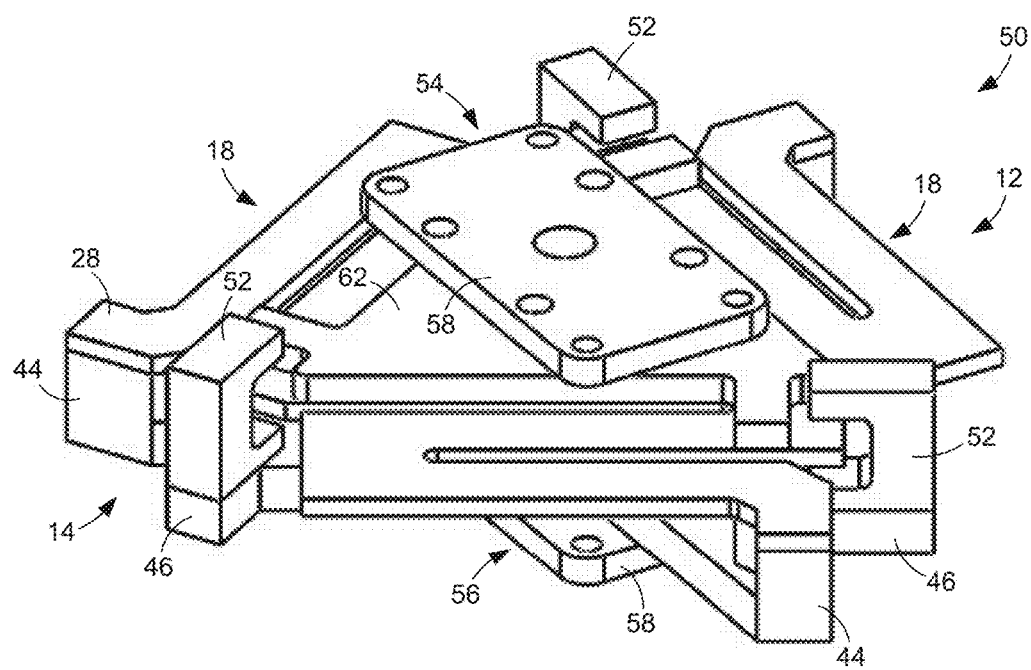
FIG. 7 is a top perspective view of a sensor assembly that incorporates a compliant force/torque sensor.
Figure 8:
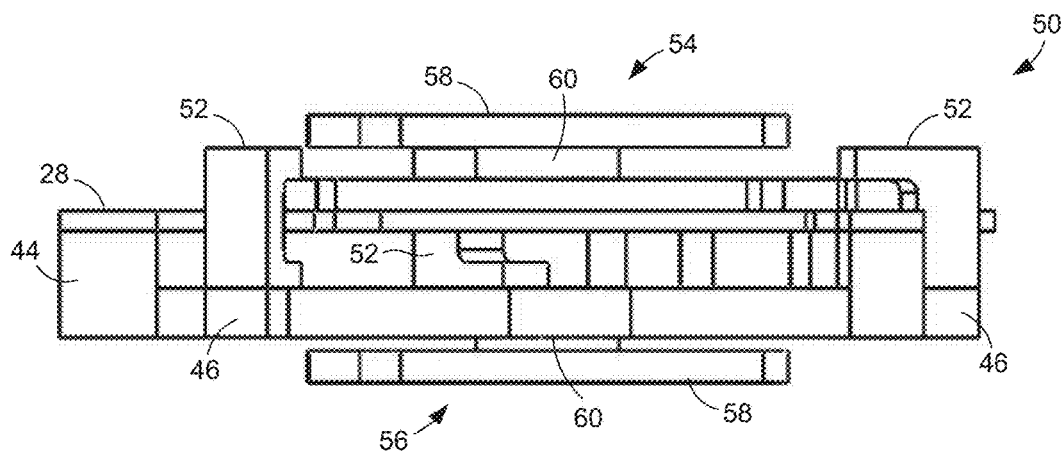
FIG. 8 is a side view of the sensor assembly of FIG. 7.

A compliant force-torque sensor of the type described above can be integrated into a robotic system for the purpose of providing active and passive compliance useful in controlling the system. In order to enable such use, the sensor can be incorporated into a sensor assembly that can, for example, be mounted between a robotic manipulator and a robotic end effector. An embodiment of one such sensor assembly 50 is illustrated in FIGS. 7 and 8. As shown in these figures, the assembly 50 includes the compliant force/torque sensor 10 described above, which includes the orthoplanar spring 12 and the support member 14 (see FIG. 2). As is apparent in FIGS. 7 and 8, mechanical stops 52 have been mounted to each mechanical stop mounting tab 46 of the support member 14. As noted above, the mechanical stops 52 limit the degree to which the orthoplanar spring 12 can deform to prevent damage to the spring.

The sensor assembly 50 further includes upper and lower mounting members 54 and 56 that are respectively positioned above and below the sensor 10. These mounting members 54, 56 facilitate mounting to a robotic end effector and a robotic manipulator, respectively. As shown most clearly in FIG. 8, each mounting member 54, 56 includes a mounting plate 58 from which extends a shaft 60 that is adapted to secure to the sensor 10. In the illustrated embodiment, the shaft 60 of the lower mounting member 56 is received within the opening 38 provided within the support member 14 (see FIG. 1), while the shaft 60 of the upper mounting member 54 is received by a similar opening (not visible) that is provided in a stiffening plate 62 that is mounted to the central platform of the orthoplanar spring. When provided, the stiffening plate 62 provides structural integrity to the orthoplanar spring 12 that facilitates mounting of the upper mounting member 54.

Figure 9:
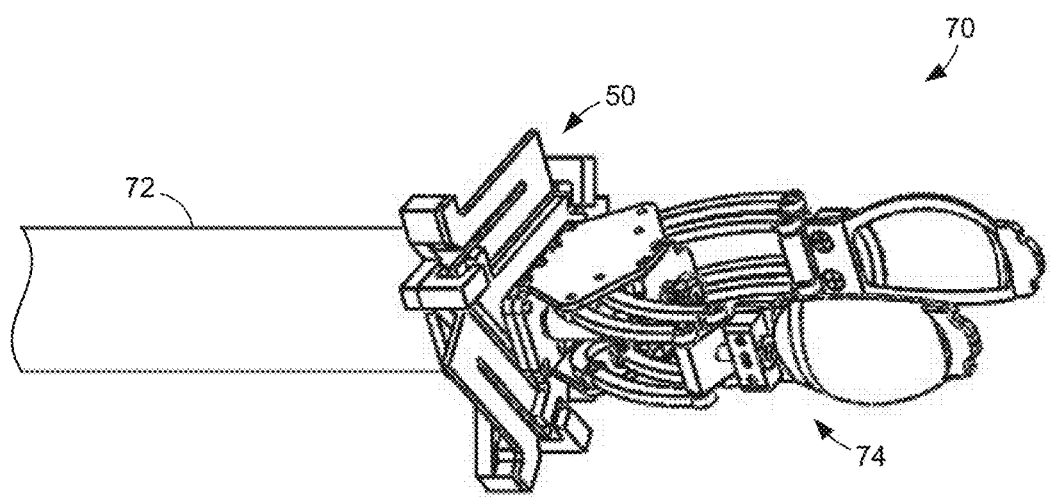
FIG. 9 is a side perspective view of a robotic system that incorporates the sensor assembly of FIG. 7.

FIG. 9 illustrates the sensor assembly 50 integrated into a robotic system 70 comprising a manipulator 72 and an end effector 74. As indicated in this figure, the sensor assembly 50 is mounted between the manipulator 72 and the end effector 74.

A prototype sensor assembly of the type shown in FIGS. 7 and 8 was developed to test the validity of the design concept and the design methods described above. An orthoplanar spring was laser cut from a Delrin sheet, while the other components were three-dimensionally printed using polyactic acid (PLA) polymer.

An attachment for the sensor was laser cut so that weights could be applied to the sensor and generate known forces and moments. The calibration law chosen is based on the transducer model discussed above. First, Hall-effect sensor voltages are converted into magnetic field measurements using:

$$B_i = \pm \frac{1}{K}(v_i - v_0) \quad (24)$$

where $v_i$ is the voltage output from the $i_{th}$ Hall-effect sensor. This magnetic field measurement is converted into a measurement of magnet position relative to the corresponding Hall-effect sensor by rearranging Equation 18 into:

$$y_i = \sqrt{\left(\frac{a}{B_i}\right)^{\frac{2}{3}} - r^2} \quad (25)$$

Then, assuming small displacements, the applied forces and moments are linearly related to the magnet positions, $y_i$, by:

$$\begin{bmatrix} F_y \\ M_x \\ M_z \end{bmatrix} = A \begin{bmatrix} y_1 \\ y_2 \\ y_3 \end{bmatrix} + G \quad (26)$$

where the elements of matrices A and G are curve fit parameters. The prediction error in this curve fit will contribute to the combined uncertainty.

Figure 10:
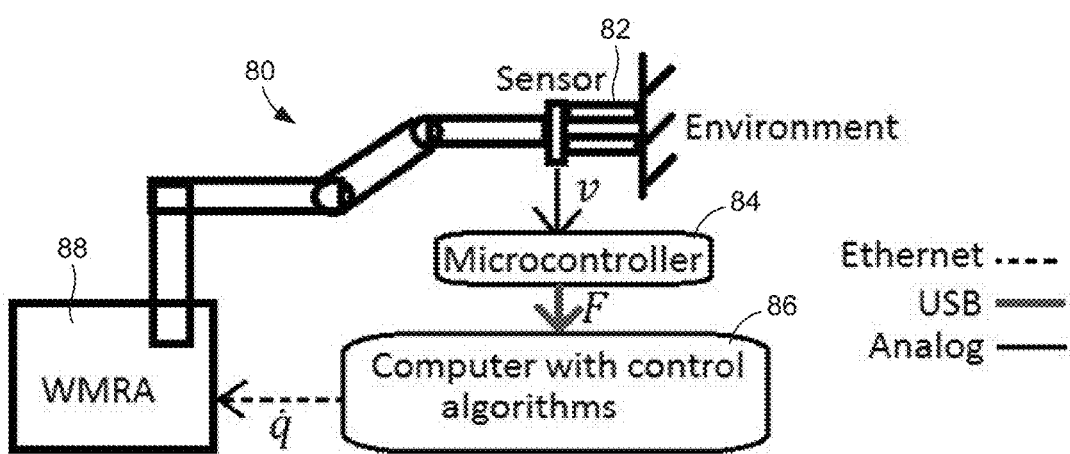
FIG. 10 is a schematic view illustrating control of a robotic system based upon force and/or torque measurements obtained from a compliant force/torque sensor.

In some embodiments, the conversion of the voltage measurements from the Hall-effect sensors into force and torque measurements can be performed by a microcontroller of the robotic system. FIG. 10 schematically illustrates such a configuration. As shown in this figure a sensor 10 is provided between a manipulator 80 and an end effector 82 that interacts with an environment. Voltages, v, are generated by the sensor 10 responsive to this interaction and are provided to a microcontroller 84, that comprises a non-transitory computer-readable medium that stores computer-executable instructions that, when executed, convert the voltages to force/torque measurements, F. The measurements are then provided to a computer 86 that comprises algorithms for controlling operation of the robotic system. Based upon the force/torque measurements, the computer 86 can provide control instructions, q, to the robotic system computer 88.

Tests were performed to determine estimates of each type of error inherent in the measurement system, then each of the error estimates may be combined into an overall estimate of the instrument error, which is called the instrument uncertainty. The uncertainty is caused by the combined effects of calibration errors, sensor drift, and sensor noise. Four elemental errors were considered in determining the instrument uncertainty of the developed force/torque sensor: calibration error, sensor drift, sensor repeatability, and sensor noise. The calibration error is determined from statistical analysis of the calibration data, while further prototype tests were performed to estimate the other elemental errors. The contribution from each elemental error is listed in Table 3. The combined uncertainty, found using the RSS method is shown in Table 4.

TABLE 3

Uncertainty due to elemental errors at 95% confidence.

| Elemental Error | $F_y$ (N) | $M_x$ (N · mm) | $M_z$ (N · mm) |
|---|---|---|---|
| Drift | ≤0.1 $F_y$ | ≤0.1 $M_x$ | ≤0.1 $M_z$ |
| Repeatability | 0.147 | 6.210 | 5.486 |
| Noise | 0.1308 | 7.985 | 7.973 |
| Calibration error | 0.2076 | 18.65 | 13.86 |

TABLE 4

Combined instrument uncertainty at 95% confidence.

| Measurement Axis | Uc without drift | Uc drift at maximum load |
|---|---|---|
| $F_y$ | 0.286 (N) | 1.04 (N) |
| $M_x$ | 21.2 (N-mm) | 54.3 (N-mm) |
| $M_x$ | 16.9 (N-mm) | 52.8 (N-mm) |

Tests were also performed to establish that the sensor assembly can be successfully integrated with a robotic system and to set a benchmark for the performance obtainable with the sensor. In these tests, force measurements from an external scale were compared to the desired contact force, as well as the force indicated by the developed force/torque sensor. Two different experimental setups were used. In Setup 1, the force measurement axis of the sensor was tested, while in Setup 2, a moment measurement axis of the sensor was tested. In Setup 2, a force applied at the contact point generates a moment through a moment arm of 225 mm, which is measured by the sensor's moment measurement axis. The force measured by the scale was converted into a moment by multiplying the scale reading in Newtons (N) by 225 mm. Tests were performed with a linearly increasing desired force.

Figure 11A:
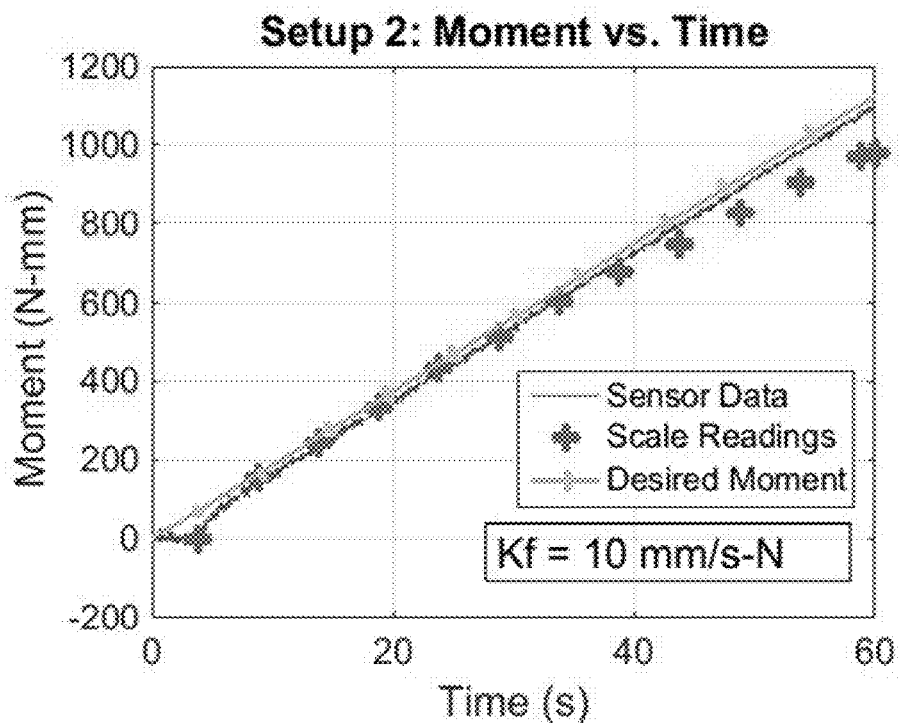
FIGS. 11A and 11B are graphs that plot force versus time and moment (torque) versus time, respectively, obtained during testing of a prototype compliant force/torque sensor.
Figure 11B:
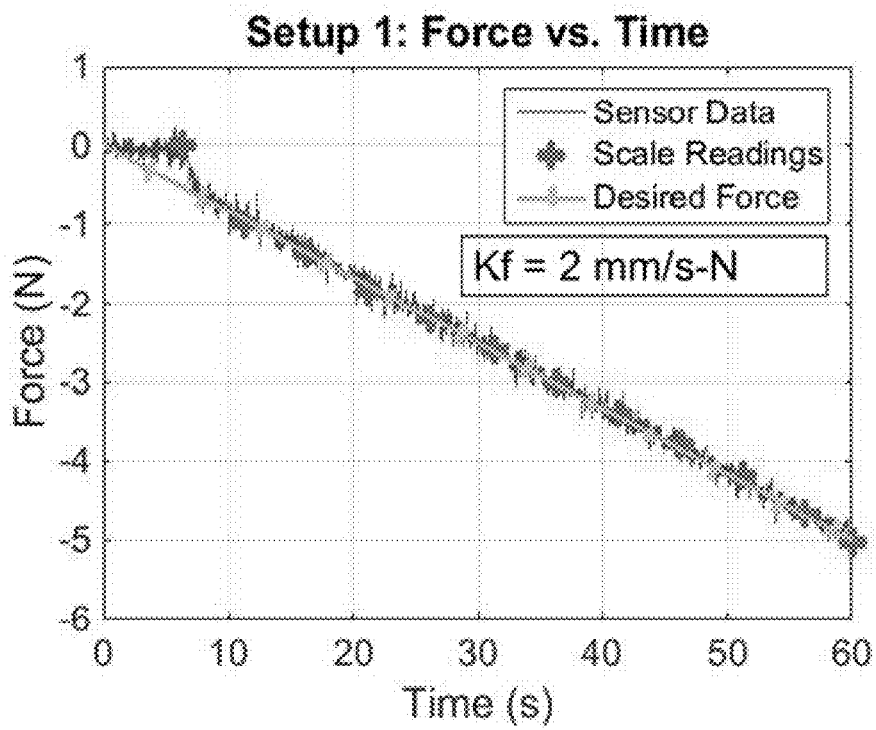

The sensor and scale force and moment measurements for Setups 1 and 2 are plotted against time in FIGS. 11A and 11B, respectively. The maximum difference between the scale and sensor measurements for both setups is shown in Table 5.

TABLE 5

Maximum error between sensor and scale measurements with increasing desired force.

|  | Setup 1 | Setup 2 |
|---|---|---|
| Maximum Difference | 0.217 N | 114.7 N-mm |

Consistency was found between the sensor and scale measurements in Setup 1, however, a relatively large difference occurs in Setup 2 at moments above 700 N-mm. Further examination revealed the contact point shifts outward as the contact force increases due to the compliance of the sensor and gripper. This increases the moment arm, which reduced the contact force and, in turn, the moment indicated by the scale. This effect is the likely explanation for the increased error that develops in Setup 2.

As noted above, alternative embodiments are possible. In one such alternative, different sensor elements can be used. For example, instead of Hall-effect sensors and magnets, optical sensors, strain gauges, force transducers, capacitors, or other sensors can be used to measure deflection of the orthoplanar spring or forces applied to the spring.

The invention claimed is:
1. A sensor assembly comprising:
a compliant force/torque sensor including an orthoplanar spring including a central platform and multiple legs that extend out from the central platform, a support member configured to support the orthoplanar spring, wherein the central platform of the orthoplanar spring can move relative to the support member, and sensor elements configured to sense movement of the central platform of the orthoplanar spring relative to the sup- port member, the sensor elements including a magnet mounted to the orthoplanar spring and a proximity sensor mounted to the support member;

an upper mounting member configured to mount the assembly to a first component of a robotic system; and a lower mounting member configured to mount the assembly to a second component of a robotic system.

2. The sensor assembly of claim 1, wherein the sensor elements comprise multiple magnets mounted to the orthoplanar spring and multiple Hall-effect sensors mounted to the support member in proximity to the magnets.

3. The sensor assembly of claim 1, further comprising mechanical stops mounted to the support member that limit movement of the central platform of the orthoplanar spring.

4. The sensor assembly of claim 1, further comprising a stiffening plate mounted to the central platform of the orthoplanar spring to which the upper mounting member is mounted.

5. A robotic system comprising:
a robotic manipulator;
a robotic end effector; and
a sensor assembly that connects the robotic end effector to the robotic manipulator, the sensor assembly comprising:
a compliant force/torque sensor including an orthoplanar spring including a central platform and multiple legs that extend out from the central platform, a support member configured to support the orthoplanar spring, wherein the legs of the orthoplanar spring are mounted to the support member in a manner in which the central platform of the orthoplanar spring can move relative to the support member, and sensor elements configured to sense movement of the central platform of the orthoplanar spring relative to the support member, the sensor elements including a magnet mounted to the orthoplanar spring and a proximity sensor mounted to the support member, an upper mounting member mounted to the robotic end effector, and a lower mounting member mounted to the robotic manipulator.

6. The robotic system of claim 5, wherein the sensor elements comprise multiple magnets mounted to the orthoplanar spring and multiple Hall-effect sensors mounted to the support member in proximity to the magnets.

7. The robotic system of claim 5, further comprising mechanical stops mounted to the support member that limit movement of the central platform of the orthoplanar spring.

8. The robotic system of claim 5, further comprising a stiffening plate mounted to the central platform of the orthoplanar spring to which the upper mounting member is mounted.

9. The robotic system of claim 5, further comprising a microcontroller configured to receive a voltage measurement from the compliant force/torque sensor and compute an associated force and torque from the voltage measurement.

* * * * *